United States Patent [19]
Vargo

[11] Patent Number: 5,369,925
[45] Date of Patent: Dec. 6, 1994

[54] POST PROTECTOR

[75] Inventor: William R. Vargo, Lithonia, Ga.

[73] Assignee: Hardy Manufacturing, Inc., Lithonia, Ga.

[21] Appl. No.: 69,426

[22] Filed: Jun. 1, 1993

[51] Int. Cl.⁵ .............................................. E04H 12/28
[52] U.S. Cl. .......................................... 52/244; 52/727;
211/183; 211/191; 248/345.1; 248/645
[58] Field of Search ................... 52/244, 170, 292, 298,
52/727, 728, 288.1; 211/183, 191; 248/345.1,
615, 548, 900, 635

[56] References Cited
U.S. PATENT DOCUMENTS

| | | | |
|---|---|---|---|
| 1,101,307 | 6/1914 | McDonough | 52/244 |
| 1,486,594 | 3/1924 | Malone | 52/298 |
| 3,372,552 | 3/1968 | Liddell | 52/728 |
| 4,113,110 | 9/1978 | Mittag | 52/244 |
| 4,645,168 | 2/1987 | Beard | 248/900 |
| 4,779,389 | 10/1988 | Landers | 52/170 |

Primary Examiner—Carl D. Friedman
Assistant Examiner—Kien T. Nguyen
Attorney, Agent, or Firm—Vickers, Daniels & Young

[57] ABSTRACT

A post protector which is placed around a portion of a column to be protected from impact or shock loading. The post protector is fastened to the floor and non-destructively absorbs impacts from objects which would otherwise impact the column. The post protector comprises an elongated portion which is placed adjacent and around the column. A flange is also provided which extends from the elongated portion and is fastened to the floor via openings through the flange. Fasteners are inserted through the openings which anchor the post protector to the floor. The flange also includes an elastic membrane which allows the post protector to elastically move upon impact whereby the post protector non-destructively absorbs the impact force of an object.

39 Claims, 4 Drawing Sheets

POST PROTECTOR

The present invention relates to a post protector used in storage warehouses and the like and, more particularly, to an anchor structure for use in a post protector system.

The invention is particularly applicable to and will be described with specific reference to preventing impacts from warehouse vehicles and other objects to structural columns within a warehouse system. However, it will be appreciated that the invention is applicable to a post protector for any type of structural column or as temporary protection to certain columns during construction or as an anchor structure for any column not requiring a rigid connection.

BACKGROUND OF THE INVENTION

A post protector is a term commonly used in the art to define any system or method in which a structural column is protected from shock or impact loading, such as when a column is rammed by forklift trucks in a warehouse setting. As used herein, post protector includes not only protection of such warehouse structural columns but includes protection for any columns in which it is desired that the column be protected from shock or impact loading, Post protectors typically consist of any intermediate object between a column and the object which may produce an impact load such as a forklift truck. Traditionally, such intermediate objects have consisted of curbs or "stops" placed on the floor or formed in place to prevent the wheels of a vehicle from impinging upon the space where the structural column is located. Typically, the "stops" are not anchored in place and thus do not effectively control the vehicle's movement. Where the post protector consists of a curb, a warehouse floor is typically constructed at different elevations, thereby hindering any flexibility as to arrangement within the warehouse. Additionally, such curbs can serve to reduce access to a rack as they not only protect the zone around a column but serve to protect a zone surrounding the entire rack system. Finally, while such systems may prevent a vehicle from entering a specified zone by prohibiting tires from traversing further, the forks on a forklift truck typically extend beyond the low stops or curbs, thereby negating any advantage gained with stops or curbs.

Further improvements in post protectors have resulted in structures specifically made for the purpose of wrapping partially around a column and extending upward from the base of a column to protect the column from the wheeled vehicle and from the forks of a forklift truck. Such prior art post protectors are either anchored to the floor or placed on the floor in front of a column without anchorage. However, it has been found that post protectors without anchors are of little use.

Post protectors without anchors easily move upon the force of impact, and hence do not adequately perform the intended function. While large, heavy, unanchored post protectors may protect a post and not move upon impact, such protectors, such as concrete posts, have the effect of damaging any vehicle or object upon impact. Therefore, it has been found that the most desirable post protectors are anchored to the floor in the vicinity of the column. Such protectors protect the column without reducing flexibility or access to a structural rack.

A typical prior art post protector is made of steel for its strength and rigidity and relatively lightweight properties. Post protectors are typically anchored to a concrete floor by placing an anchor bolt through a flange of the post protector. While such a protector serves the intended purpose of preventing impact to a column for small impact loads, there are a number of disadvantages. An impact on the upper portion of a post protector forces the post protector to rock or pivot about the flange portion, causing the steel protector to cut into the concrete. Additionally, this pivoting action places tensile forces on the anchor bolts and the concrete. Since concrete has very low strength properties in tension, the concrete will crack, loosen and, in extreme cases, pop out of the floor. The structural integrity of the post protector is thereby diminished.

Once the concrete has been weakened or destroyed, it is virtually impossible to repair the concrete to its prior strength. Concrete patches do not adequately bond to the concrete already in place. Therefore, once the anchorage of a post protector has been damaged, it is not possible to re-anchor the post protector with the same strength as when originally placed.

Where the post protector rocks or pivots upon impact with a forklift truck either due to lack of anchorage, or when the anchorage is damaged, the protector hits the column of which it is intended to protect. Such an impact has all the disadvantages of impacting an unprotected column. It may result in damage to the column, reducing the structural integrity, or inducing vibration, causing side sway. Side sway to a loaded rack, upon which pallets are placed may damage the pallet loads or induce loads in the structural rack for which it was not designed, causing catastrophic failure of the entire rack system.

Further, even when the post protector is rigidly anchored and the anchorage does not fail upon impact, the post protector is not allowed to "float" or move to absorb an impact. Therefore, impact upon the post protector can result in damage to either the post protector or the forklift truck. Additionally, the prior art post protector allows dirt to accumulate between the flanges of the post protector itself and between a column and the post protector. In certain industries, especially where food may be stored or spillage is common, such accumulation of dirt and/or spillage is highly undesirable.

SUMMARY OF THE INVENTION

Accordingly, it is a principal object of the invention to provide a post protector which overcomes the disadvantages of prior art post protectors and post protector anchor structures in that an anchor structure for a post protector is provided which safely protects the column while absorbing impact or shock loads.

The present invention overcomes the disadvantages of prior art post protectors by providing a post protector having an elongated portion which is placed adjacent to at least one portion of a column. Further the post protector has a flange portion which extends from the elongated portion and which is placed flush with the floor. The flange portion has a number of openings and further includes an elastic membrane which allows the post protector to move laterally or pivotally in an elastic manner. Finally, the post protector includes fasteners which protrude through openings in the flange and holes in the elastic membrane and anchor the post protector to the floor.

The elastic membrane is comprised of a rubber or plastic material which elastically deforms when subjected to outside forces. The elastic membrane is either mechanically or integrally attached to the flange portion. Preferably, the post protector is located in a position adjacent to a column of a structure. A post protector may be adjacent to all sides of a column or only a portion of all of the sides, but is preferably orientated in a position adjacent the outside edges of a structure where the post protector will best protect the structure from outside shock or impact forces. The post protector is anchored to the floor of a warehouse using concrete drive anchors which are placed through the holes in the flange portion. Thus, when a moving object, such as a forklift truck, is in the vicinity of a structural column, the post protector acts as a buffer between the truck and the structural column. Instead of the truck or other object hitting the structural column, it instead strikes the post protector. This advantageously protects the structural column and thus an entire structural rack from being damaged. Such damage can occur when a column is deformed due to impact or when the force of impact causes the entire structure to shift due to side sway. Damage to one structural column may affect the structural integrity of the entire support structure. Inducing side sway in a structure can result in the collapse of the entire structure.

The prior art shows post protectors anchored within a concrete floor which are easily damaged when hit by an object or piece of moving equipment. The impact upon a prior art post protector rocks the post protector toward the structural column. This causes an uplifting force which has the tendency to pull the concrete anchor free of the concrete. The resulting uplifting force pulls up large chunks of concrete which are greater shaped and can be up to six times the size of the original concrete drive anchor. As the post protector has now lost its structural integrity, it is useless. It is nearly impossible to try to re-anchor a post protector where the concrete has been removed. The present invention solves these problems by providing an elastic membrane at the flange of the post protector. The elastic membrane allows the post protector to elastically move upon impact from an object or equipment. The elastic membrane has the ability to absorb impacts from objects without damaging its structural integrity while continuing to prevent an impact with a structural column.

In accordance with the present invention the elastic membrane is located between the flange of the post protector and the floor. In such a position, the post protector can rock or pivot upon impact, thereby allowing the post protector to elastically crush the elastic membrane at a side closest to the structural column.

Further in accordance with the present invention the elastic membrane includes an elastic cylinder, homogeneous with at least the bottom portion of the elastic membrane. The elastic cylinder is located within the openings of the flange. When the post protector is installed, concrete drive anchors pass through the hole in the elastic cylinder as they are placed in the floor. Preferably, the elastic cylinder has an outside diameter substantially equal to the diameter of the flange opening, and an inside diameter of the hole which is equal to one-half of the outside diameter. Thus, when an object strikes the post protector, the post protector is allowed to pivot due to the bottom portion of the elastic membrane and is also allowed to "float" or elastically and laterally move. Therefore, when an object strikes the post protector, the post protector can simultaneously move laterally toward the structural column and pivot toward the structural column without damaging the concrete anchor.

Preferably, the elastic membrane includes a top portion which is homogenous with the elastic cylinder and bottom portion already described. The elastic membrane thus forms an outer surface of the flange. The concrete drive anchor passes through the elastic cylinder portion as the post protector is mounted to the floor. Preferably, both the top and bottom portions each have a thickness which is substantially the same thickness as the flange leaf encased within the elastic membrane. Therefore, the total thickness of the flange is three times that of the flange leaf.

The elastic membrane which forms the outer surface of the flange allows greater flexibility in elastic movement of the post protector when it is impacted by an object. The top portion of the elastic membrane allows the head of the concrete anchor to deform the upper flange portion as the post protector pivots upon impact. This gives added flexibility to the post protector in combination with the elastic lateral and elastic pivot movement given by the elastic cylinder portion and the bottom portion of the elastic membrane. Further, the top portion of the elastic membrane reduces the tensile stresses upon the drive anchor and thus the tensile stresses upon the concrete to which the post protector is anchored. The elastic membrane serves as a "boot" to give the post protector maximum cushion upon impact. The post is thus protected and the post protector structural integrity preserved to provide a long useful life.

Further in accordance with the present invention the post protector is provided with an elastic post cushion along the upper portion of the elongated portion. Therefore, a structural column is protected from any pivoting of a post protector that is the result of an impact with the post protector. Should the post protector pivot to such an extent that it may contact the structural column, the elastic post cushion prevents metal-to-metal surface contact by elastically softening any impact. Such a post protector in combination with the elastic membrane at the flange has the ability to elastically pivot toward the structural column in a manner greater than heretofore conceived in the prior art. Therefore, any impact not previously dissipated by the elastic membrane on the flange portion is dissipated by the post cushion. Additionally, the elastic post cushion will prevent metal-to-metal contact between the post protector which does not make use of an elastic membrane, as shown in the prior art, and a structural column.

In accordance with another aspect of the present invention, the elastic membrane has a footprint on the ground which comprises a smooth, non-angular, outside footprint. Thus, any spaces between adjacent flange leaves are filled with elastic material. Such a footprint adds to the elasticity of the post protector as a whole and has the added advantage of preventing dirt from being trapped between adjacent flange portions, thus providing a cleaner and more efficient work space, Thus, it is a principal object of the invention to provide an improved post protector and anchor structure which enables elastic and non-destructive movement of the post protector upon impact with moving equipment or the like.

It is another object of the invention to provide a post protector which prevents moving equipment from impacting upon a structural column.

Still another object of the invention is to extend the useful life of a post protector which is anchored to the floor.

Yet another object of the present invention is to provide a post protector which does not damage the floor upon impact with moving equipment.

Still another object of the present invention is to provide a post protector which can elastically pivot upon impact without affecting the structural integrity of the post protector anchor structure.

Further, another object of the present invention is to provide a post protector which is allowed to elastically and laterally move upon impact without damage to the anchor structure.

Still further, another object of the present invention is to provide a post protector and anchor structure which does not damage the concrete floor in such a manner that re-anchorage is prevented.

It is still another object of the present invention to provide a post protector with a post cushion which prevents metal-to-metal contact between the post protector and the structural column.

Another object of the present invention is to provide a post protector with an outer flange surface which prevents the accumulation of trapped dirt between adjacent flanges thus enabling easy cleanup in a warehouse environment.

BRIEF DESCRIPTION OF DRAWINGS

The foregoing and other objects of the invention will become apparent to those skilled in the art upon reading and understanding the following detailed description of preferred embodiments of the invention shown in the accompanying drawings in which.

DESCRIPTION OF PREFERRED EMBODIMENTS

Figure 1:
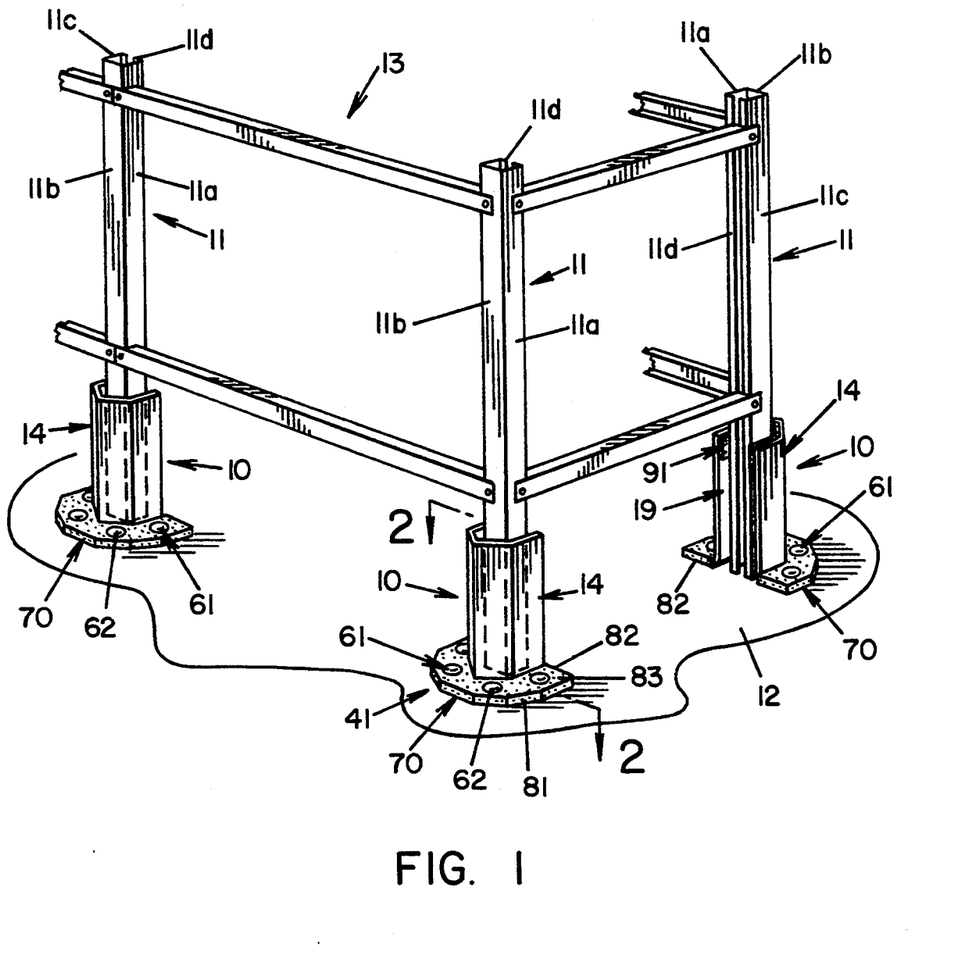
FIG. 1 is a pictorial view illustrating the use and preferred orientation of a post protector according to the present invention.

Referring now to the drawing, wherein the showings are for the purpose of illustrating preferred embodiments of the invention only and not for the purpose of limiting same, FIG. 1 shows a plurality of post protectors 10 each adjacent a structural column 11 and anchored to a concrete floor 12. As can be seen, post protectors 10 in this embodiment have a four-sided angular C-shape. The shape has the ability to protect the three sides of 11a, 11b, and 11c of structural column 11 leaving a fourth side 11d exposed. The C-shape allows post protector 10 to be installed at any time about structural column 11 of a structure such as the structural rack 13 shown in FIG. 1. Since the C-shaped post protector 10 has an open end 19, post protector 10 can be placed around any existing or in-place structural column 11 and then anchored to floor 12.

Figure 2:
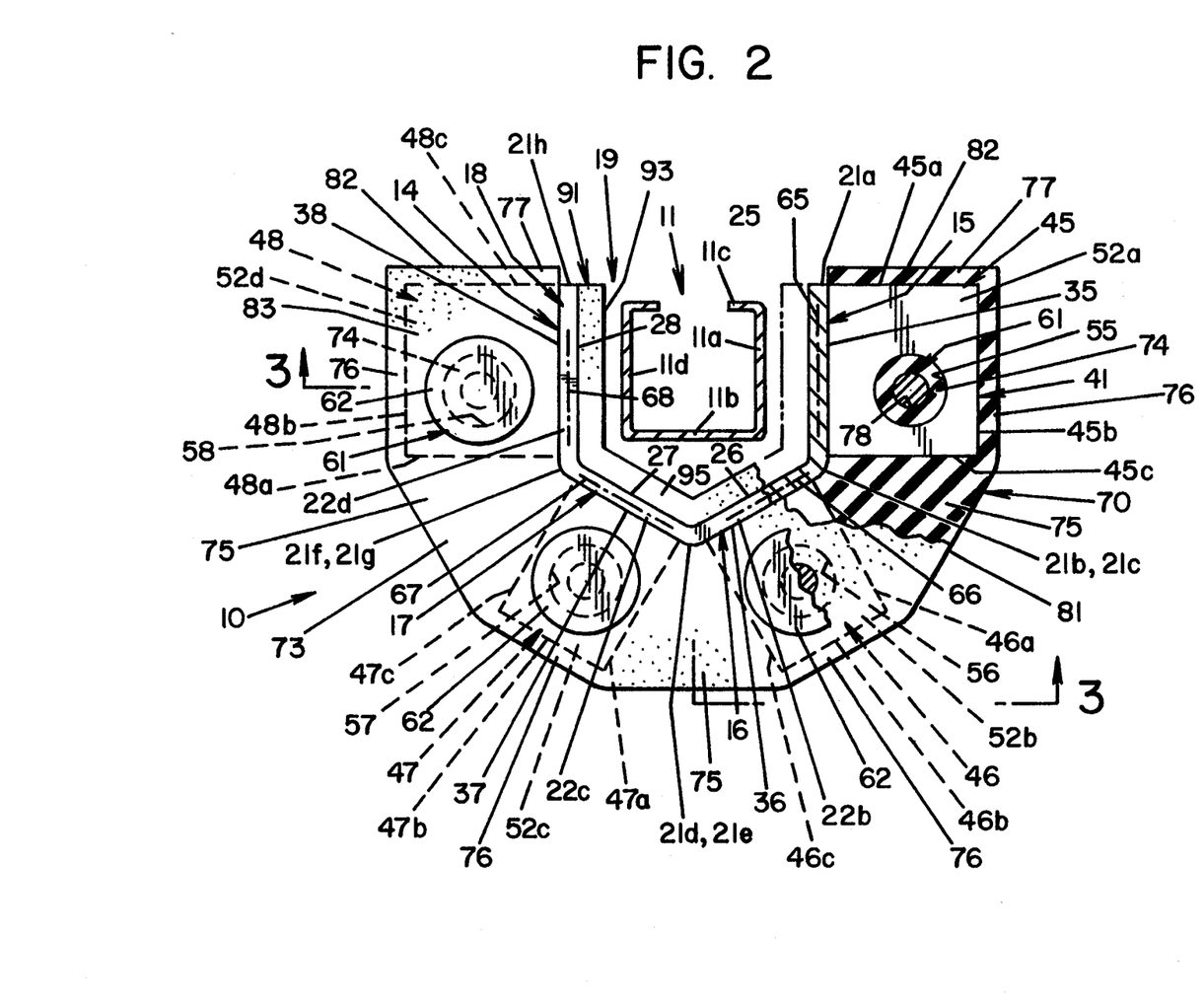
FIG. 2 is a cross-sectional plan view taken along line 2—2 of FIG. 1 showing a post protector as placed adjacent a structural column.

As best shown in FIG. 2, post protector 10 is comprised of an elongated portion 14 further comprising four planar sections 15, 16, 17 and 18. Each individual planar section has two longitudinal edges. For instance, planar section 15 has longitudinal edges 21a and 21b, planar section 16 has longitudinal edges 21c and 21d, planar section 17 has longitudinal edges 21e and 21f, and planar section 18 has longitudinal edges 21g and 21h. At least one longitudinal edge 21a–21h of each planar section 15–18 is joined to another longitudinal edge 21a–21h of an adjacent planar section 15–18. For example, planar section 15 is adjacent to planar section 16 at abutting longitudinal edges 21b and 21c. Longitudinal edges 21d and 21e join adjacent planar sections 16 and 17, while abutting longitudinal edges 21f and 21g join adjacent planar sections 17 and 18. The C-shape formed by abutting longitudinal edges 21b–21g may be formed by any number of manufacturing processes including welding separate plates or rolling a homogenous sheet. As such, abutting longitudinal edges are preferably indistinguishable from other exposed surfaces of post protector 10.

Each of planar sections 15, 16, 17, 18 includes a corresponding respective upper transverse edge 22a, 22b, 22c and 22d, and a lower transverse edge 23a, 23b, 23c and 23d. Each planar section 15, 16, 17, 18 has a corresponding respective column side surface 25, 26, 27 and 28. Further, each of planar sections 15, 16, 17 and 18 contain an included angle between adjacent planar sections. In the preferred embodiment each of column side surfaces 25, 26, 27, 28 is at an obtuse angle to an adjacent column side surface 25, 26, 27, 28, thus forming the C-shaped post protector 10. For example in the preferred embodiment shown, column side surface 25 is at an angle of 115° from column side surface 26, column side surface 26 is at an angle of 120° from column side surface 27 and column side surface 28 is at an angle of 115° from column side surface 27. However, it will be appreciated that the included angles between column side surfaces may take any shape, including 180° or an acute angle. In the preferred embodiment each of planar sections 15, 16, 17 and 18 include a corresponding respective exposed surface 35, 36, 37, 38. Exposed surfaces 35, 36, 37, 38 are capable of withstanding severe impacts from moving equipment such as forklift trucks and the like. As such, elongated portion 14 is preferably made of structural steel.

Extending from elongated portion 14 is flange portion 41. Specifically, flange portion 41 consists of the flange leaves 45, 46, 47 and 48. Extending from each of lower transverse edge 23a, 23b, 23c, 23d is a corresponding respective flange leaf 45, 46, 47, 48. Each flange leaf 45–48 includes a floor side 51a, 51b, 51c, 51d and an upper side 52a, 52b, 52c, 52d. Each of flange leaves 45, 46, 47, 48 are relatively orthogonal to each of the respective planar sections 15, 16, 17, 18. Each flange leaf, further, has a respective opening 55, 56, 57, 58 therethrough. A concrete drive anchor 61 is placed through each of openings 55, 56, 57, 58 so that post protector 10 may be secured to concrete floor 12. Flange leaves 45, 46, 47, 48 shown in the preferred embodiment are each separate and distinct from the adjacent flange leaf. As such each flange leaf includes lateral edges. For example flange leaf 45 includes lateral edges 45a, 45b and 45c. In a like manner, each of flange leaves 46, 47 and 48 include three lateral edges. For example flange leaf 46 includes lateral edges 46a, 46b and 46c. Separate and distinct flange leaves 45, 46, 47, 48 function independently from each of the other flange leaves, allowing greater non-destructive movement of post protector 10 upon impact. For example, upon impact, post protector 10 can rock up upon any one of flange leaves 45, 46, 47, 48. Additionally, if necessary, post protector 10 is able to bend elastically or plastically at any of axes 65, 66, 67, 68 when a force F is placed upon post protector 10. The design using separate flange leaves 45, 46, 47, 48 allows post protector 10 to bend at one of more axes 65, 66, 67, 68 instead of lifting or rocking post protector 10. Such lifting or rocking results in concrete drive anchor 61 being destructively pulled from concrete floor 12. While bending is not shown, the bending hereinbefore described would occur, for example, at either or both of axes 65 and 68 due to a force F shown in FIG. 4.

Figure 3:
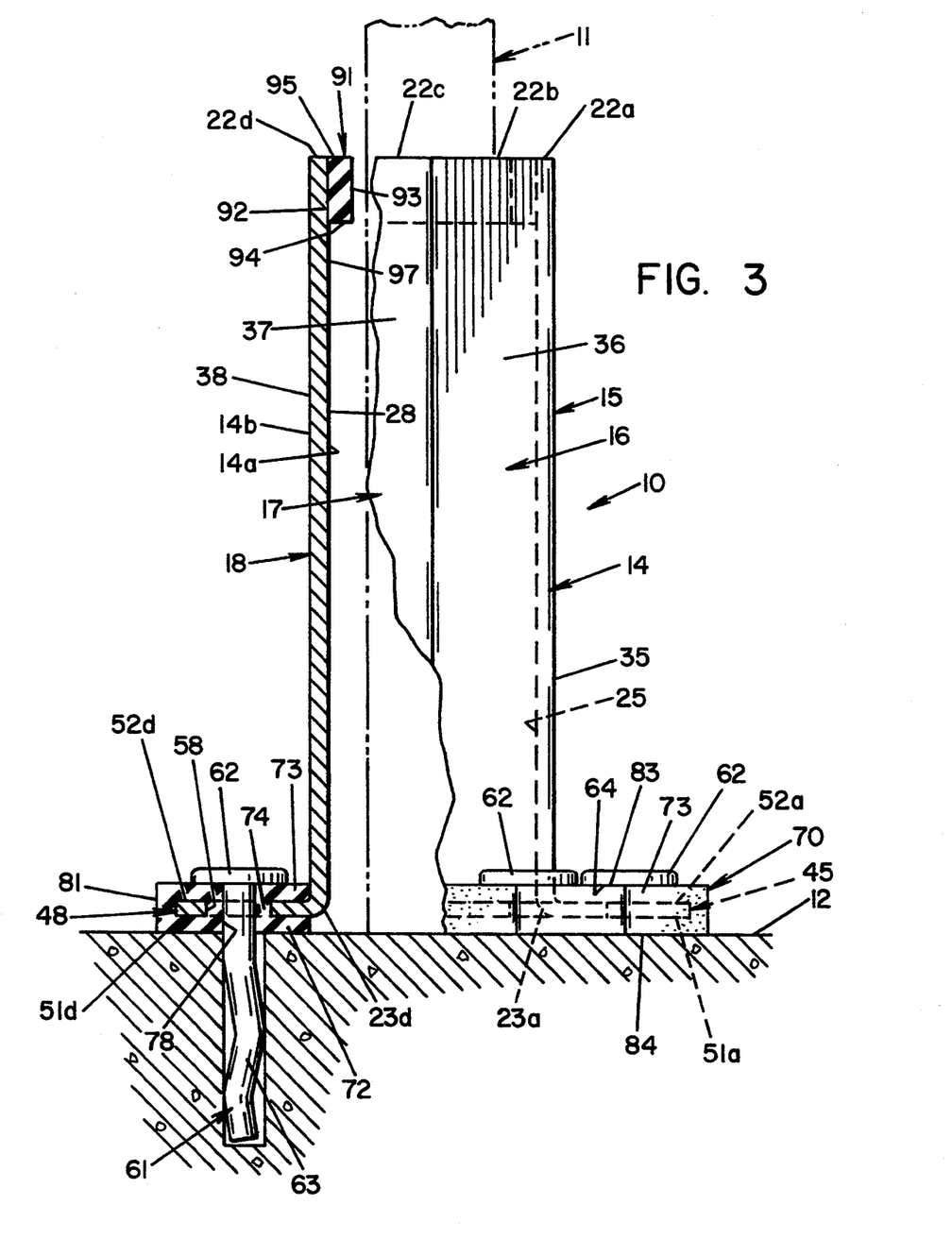
FIG. 3 is a cross-sectional view taken along line 3—3 of FIG. 2 showing in detail a post protector according to the present invention as anchored to the floor.

Post protector 10 is further comprised of an elastic membrane 70. In the preferred embodiment, elastic membrane 70 includes a bottom portion 72, a top portion 73 and an elastic cylinder portion 74. Bottom portion 72 underlies flange portion 41 and, specifically, each of flange leaves 45, 46, 47, 48 and is located between floor 12 and each one of flange leaves 45, 46, 47, 48. Top portion 73 overlies flange portion 41 and, specifically, each one of flange leaves 45, 46, 47, 48, and is in abutting surface-to-surface contact with each of upper sides 52a, 52b, 52c, 52d. Bottom portion 72 is in abutting surface-to-surface contact with both floor side 51a, 51b, 51c, 51d of respective flange leaves 45, 46, 47, 48 and with floor 12.

Elastic membrane 70 also includes a flange filler portion 75 adjacent bottom portion 72 and top portion 73. Substantially, flange filler portion 75 of elastic membrane 70 occupies the spaces between adjacent flange leaves 45 and 46, between 46 and 47 and between 47 and 48. Further, as shown in FIG. 2, flange filler portion 75 is located adjacent and substantially between lateral edges 45c and 46a, between lateral edges 46c and 47a and further between lateral edges 47c and 48a. Providing elastic membrane 70 with flange filler portion 75 serves at least two advantageous purposes. Flange filler portion 75 allows post protector 10 greater ability to elastically respond to an impact with a moving object. Further, flange filler portion 75 eliminates cracks and crevices between adjacent flange leaves 45, 46, 47, 48 where dirt can collect and is difficult to remove. This is a distinct advantage in certain warehouse settings where spillage easily occurs or alternatively in warehouse environments which must be kept especially clean.

Elastic membrane 70 further includes outer edge portions 76 and outer end edge portions 77. Outer end edge portions 77 extend between bottom portion 72 and top portion 73 of flange leaves 45 and 48. Further, outer end edge portions 77 are in abutting side-by-side contact with lateral edges 45a and 48c.

Outer edge portions 76 also extend between bottom portion 72 and top portion 73. Outer edge portions 76 are in abutting side-by-side contact with lateral edges 45b, 46b, 47b and 48b. Further, at flange leaves 45 and 48, outer edge portion 76 is bounded between outer end edge portions 77 and flange filler portion 75, while at flange leaves 46 and 47, outer edge portions 76 are bounded by adjacent flange filler portions 75. Both outer edge portions 76 and outer edge end portions 77 provide added flexibility to the elastic membrane 70 as a whole, and provide the means for completely enclosing each of flange leaves 45-48 within elastic membrane 70.

In the preferred embodiment, therefore, elastic membrane 70 forms an elastic boot which comprises the entire outer surface of flange portion 41. The outer surface of elastic membrane 70 is comprised of surface edge 81, surface end edges 82, top membrane surface 83 and bottom membrane surface 84. Surface edge 81 is relatively adjacent to outer edge portions 76 and flange filler portions 75. Surface end edges 82 are relatively adjacent to outer end edge portions 77, while top membrane surface 83 is adjacent to top portion 73 and bottom membrane surface 84 is adjacent to bottom portion 72.

Figure 4:
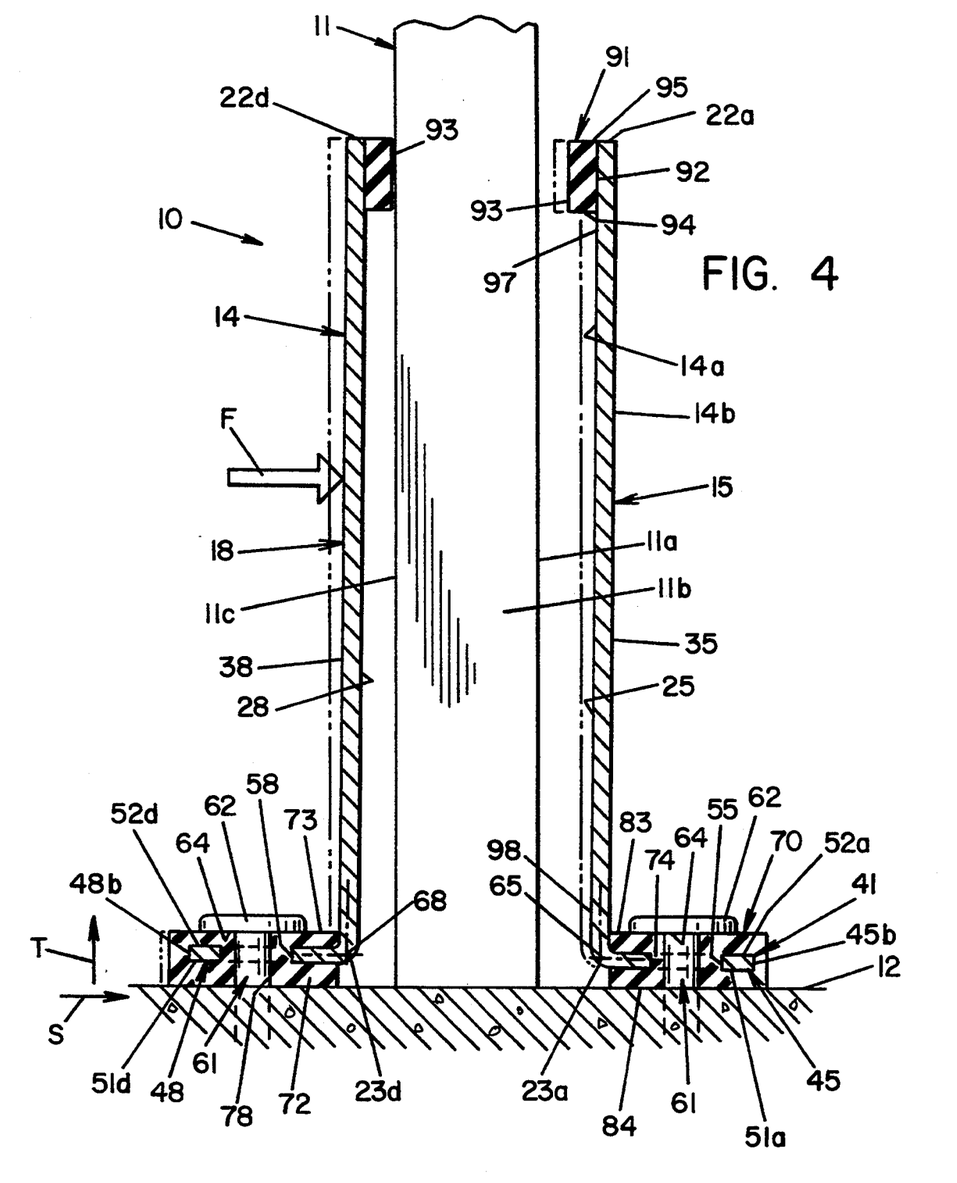
FIG. 4 is an elevation view of a post protector taken in cross-section showing how the post protector elastically moves when an outside force is applied.

Elastic membrane 70 works to provide the means for allowing post protector 10 to elastically move in response to an impact or shock load placed upon post protector 10. As best shown in FIG. 4, a force is placed upon post protector 10. In response post protector 10 rocks towards structural column 11. However, the force F is dampened by elastic membrane 70 in order that tensile forces are not induced in concrete anchor 61 to cause anchor 61 to pull up from concrete floor 12.

In the preferred embodiment shown, each of top portion 73 and bottom portion 72 has a thickness of $\frac{1}{4}''$ extending orthogonally from the upper sides 52a-52d to top membrane surface 83 and from the floor sides 51a-51d to bottom membrane surface 84, respectively. Further, lateral edges 45a-45c, 46a-46c, 47a-47c, and 48a-48c have a thickness of $\frac{1}{4}''$ between floor sides 51a-51d and upper sides 52a-52d. Therefore, the total thickness of surface edge 81 and surface end edge 82 of elastic membrane 70 between top membrane surface 83 and bottom membrane surface 84 is $\frac{3}{4}''$.

Preferably, each opening 55, 56, 57, 58 within each of corresponding respective flange leaves 45, 46, 47, 48 are 1" in diameter. However, each elastic cylinder portion 74 located within each of openings 55, 56, 57, 58 has an outside diameter of 1" for snugly fitting within openings 55–58 and an inside diameter of $\frac{1}{2}''$ defining cylinder holes 78. Concrete drive anchor 61 has a head 62 having a diameter of $1\frac{1}{2}''$ and a shank 63 having a diameter of $\frac{1}{2}''$ and a length of 4". Therefore, shank 63 fits snugly within elastic cylinder portion 74 and specifically within cylinder holes 78. Further, head 62 engages top membrane surface 83 of elastic membrane 70. Since the diameter of head 62 is larger than the diameter of openings 55–58, concrete anchor 61 will not tear membrane 70 since anchor 61 cannot be pulled through openings 55–58 when force F impacts post protector 10.

The dimensional relationship between elastic cylinder portion 74 and cylinder holes 78, openings 55–58 and concrete drive anchor 61, including the dimensions of head 62 and shank 63, uniquely provide an anchor structure for post protector 10 which is anchored to concrete floor 12. With further reference to FIG. 4, force F impacts post protector 10. In response, post protector 10 will elastically move from its anchored position. Specifically, flange portion 41 exerts both tensile forces T and shear forces S upon concrete drive anchor 61. The concrete drive anchor closest to the impact point of force F will be subject to the greatest forces, T and S, since the structure of post protector 10, including elastic membrane 70, dampens the effects of force F further from the impact point.

As noted in FIG. 4, tensile force T is caused by the moment arm bending stress induced by force F. As flange portion 41 exerts tensile force T on the underside surface 64 of head 62 tensile force T is transmitted to concrete anchor 61. Tensile force T is further transmitted to the concrete by concrete anchor 61. Each concrete anchor is preferably made of steel. Since steel is generally at least twelve times stronger in tension than is unreinforced concrete, tensile force T causes concrete floor 12 to fail. This results in concrete anchor 61 pulling up from concrete floor 12. It has been found that a ½" diameter concrete anchor 61 will form a 3" diameter greater in concrete floor 12. However, the present invention prevents tensile force T from being transmitted to concrete floor 12 by dampening force T. Top portion 73 comes into direct side-by-side contact with underside surface 64 and force T is dampened and dissipated as it is distributed by elastic membrane 70. Further, the tensile force T is also dissipated as bottom portion 72 is deformed between flange leaves 45, 46, 47, 48 and concrete floor 12.

Concrete anchor 61 is also subject to shear force S. This force pushes along the length of shank 63 which is above concrete floor 12. The preferred embodiment of the present invention allows that shear force S is transmitted to shank 63 by elastic cylinder portion 74. Thus, shear force S is dampened and dissipated as elastic cylinder portion 74 is deformed. Shear force S is prevented from weakening the connection between concrete anchor 61 and concrete floor 12.

The anchor structure of the present invention uniquely prevents damage or failure of the connection between anchor 61 and concrete floor 12 by reducing the forces T and S transmitted by concrete anchor 61 to concrete floor 12. The reduction of forces T and S is uniquely provided by the elastic membrane 70 which allows post protector 10, and specifically flange leaves 45, 46, 47 and 48, to "float" or move within elastic membrane 70.

Since post protector 10 elastically rocks or pivots in response to force F while secured to concrete floor 12 by concrete drive anchors 61, elongated portion 14 may still come into contact with structural column 11. While flange portion 41 is elastically anchored in place, and moves only slightly in a lateral direction due to impact, elongated portion 14, which is preferably 12" in length, and specifically upper transverse edges 22a, 22b, 22c, 22d displace a relatively large distance in comparison with flange portion 41. The present invention seeks to prevent elongated portion 14 from metal-to-metal contact with structural column 11, which could damage column 11 or induce rocking or side sway of structural rack 13. Thus, post protector 10 is provided with an elastic post cushion 91.

Elongated portion 14 includes an inside surface 14a consisting of column side surfaces 25, 26, 27 and 28, and an outside surface 14b consisting of exposed surfaces 35, 36, 37 and 38. Each of surfaces 14a and 14b extending between upper transverse edges 22a, 22b, 22c, 22d and corresponding respective lower transverse edges 23a, 23b, 23c, 23d. Further, inside surface 14a includes an inside top portion 97 and an inside bottom portion 98. Elastic post cushion 91 is located substantially in abutting side-by-side contact with inside top portion 97. In the preferred embodiment, the elastic post cushion 91 extends between longitudinal edges 21a and 21h and is substantially adjacent to each of upper transverse edges 22a, 22b, 22c, 22d. Elastic post cushion then extends downward along inside top portion 19 and specifically extends downward 1" from each of upper transverse edges 22a, 22b, 22c, 22d. Thus, elastic post cushion 91 is in substantial side-by-side contact with planar sections 15, 16, 17 and 18.

In further detail, elastic post cushion 91 has a post surface 92, a column surface 93, an inner surface 94 and an outer surface 95. Post surface 92 is in substantial side-by-side contact with inside surface 14a and specifically inside top portion 97. In the preferred embodiment, each of inner surface 94 and outer surface 95 extending between post surface 92 and column surface 93 is ⅜" thick. Post surface 92 and column surface 93 is a 1" wide band extending downward from each of upper transverse edges 22a, 22b, 22c, 22d and extending along each planar section 15, 16, 17 and 18.

Elastic post cushion 91 prevents metal-to-metal contact between elongated portion 14 and structural column 11. As best shown in FIG. 4, when post protector 10 slides and rocks or pivots toward structural column 11 due to force F, elastic post cushion 91 and specifically column surface 93 can impact structural column 11 if force F has not been completely dissipated by elastic membrane 70 at flange portion 41. Thus, the remaining force F which has not been dissipated is further dissipated by elastic post cushion 91. Additionally, elastic post cushion 91 serves another purpose in that any non-destructive contact between elongated portion 14 and structural column 11 does not mark or mar any of surfaces 11a, 11b, 11c, 11d of structural column 11. Therefore, elastic post cushion 91 prevents the stripping away of paint on structural column 11. The paint serves both an aesthetic purpose and prevents corrosion which could structurally weaken column 11.

In the preferred embodiment, both elastic membrane 70 and elastic post cushion 91 comprise a rubber material. The specific type of rubber used may vary significantly. For example, a stiffer rubber material may be required for applications where it is contemplated that there will be large impact loads and it is required that impact forces be dampened quickly. A softer rubber may be used in applications where, for example, only the use of small pieces of equipment are used. Obviously, the use of the softer rubber increases flexibility thereby decreasing the ability of the rubber to dissipate the impact force.

The invention has been described with reference to preferred embodiments. Obviously modifications and alterations other than those discussed herein will occur to those skilled in the art upon reading and understanding the invention. For example post protector 10 and specifically elongated portion 14 may comprise less than the four planar sections 15, 16, 17 and 18 which are part of the preferred embodiment. Elongated portion 14 may consist of one or two planar sections strategically placed adjacent to structural column 11 to protect the structural column from impact. Additionally, elongated portion 14 may not comprise planar sections at all. For example, elongated portion 14 may instead comprise a section having a semi-circular cross-section.

Flange portion 41 may alternatively be comprised of more or less than the four flange leaves 45, 46, 47, 48 of the preferred embodiment. However, it is preferred that at least one flange leaf correspond to each planar section. Therefore, if elongated portion 14 only consists of two planar sections, two flange leaves, one each extending from a planar section should comprise flange portion 41. Alternatively, flange portion 41 may be comprised of only one flange leaf, for example, in a semi-circular shape corresponding to a semi-circular shaped elongated portion 14.

It is further contemplated that elastic membrane 70 and/or elastic post cushion 91 may be comprised of a different elastic component other than rubber. For example, either of elastic membrane 70 or elastic post cushion 91 may be of a stiff plastic material or of a foam material which is capable of elastic bending.

Finally, it is contemplated that elastic post cushion 91 need not function in conjunction with elastic membrane 70. For example, elastic post cushion 91 may function to dissipate force F on a structural column 11 to impact on any post protector without an elastic membrane 70, such as those in the prior art.

It is intended to include all such modifications, including preferred alternative embodiments, insofar as they come within the scope of the invention.

Having thus described the invention it is claimed:

1. A post protector to prevent objects from colliding with a portion of a column located on a floor, said post protector comprising:
  a. an elongated portion placed adjacent to a portion of said column;
  b. a flange portion, extending from said elongated portion and having a plurality of openings therethrough;
  c. elastic membrane means for elastically anchoring said flange portion to said floor; and,
  d. fastening means for protruding through said openings and anchoring said post protector to said floor wherein said elastic membrane means having holes therethrough, and said fastening means further protruding through said openings and said holes.

2. The post protrector of claim 1, wherein said holes in substantial registry with said openings.

3. The post protector of claim 1, wherein said elastic membrane means includes an elastic cylinder portion within each said opening.

4. The post protector of claim 3, wherein each said opening has a diameter and each said elastic cylinder portion has an inside diameter of each said hole, said inside diameter being substantially less than said opening diameter.

5. The post protector of claim 4, wherein said inside diameter is at least 50% less than said opening diameter.

6. The post protector of claim 1, wherein said flange portion includes an upper side and a floor side, said elastic membrane means in substantial side-by-side contact with said upper side and said lower side.

7. The post protector of claim 6, wherein said elastic membrane means includes an elastic cylinder portion within said openings.

8. The post protector of claim 7, wherein each of said openings has a diameter and said elastic cylinder portion has an inside diameter of each said hole, said inside diameter being substantially less than said opening diameter.

9. The post protector of claim 8, wherein said inside diameter is at least 50% less than said opening diameter.

10. The post protector of claim 9, wherein said fastening means includes a concrete anchor bolt having a bolt head and a bolt head diameter, said bolt head diameter greater than said opening diameter, said bolt further having a bolt shank and a bolt shank diameter, said shank diameter substantially equal to or less than said inside diameter of said elastic cylinder.

11. The post protector of claim 1, wherein said elongated portion includes an elastic post cushion.

12. The post protector of claim 11, wherein said elongated portion includes an inside surface and an outside surface, said elastic post cushion in substantial side-by-side contact with said inside surface.

13. The post protector of claim 12, wherein said inside surface includes a top portion and a bottom portion, said bottom portion adjacent said flange portion, said top portion in substantial side-by-side contact with said elastic post cushion.

14. The post protector of claim 1, wherein said flange portion includes a plurality of flange leaves extending from said elongated portion.

15. The post protector of claim 14, wherein said elongated portion includes a plurality of planar sections, each said planar section adjacent at least one other said planar section, each section having longitudinal edge and lower transverse edges, at least one said longitudinal edge of one of said planar sections joined to another said longitudinal edge of another said planar section.

16. The post protector of claim 15, wherein one of said flange leaves extends from each of said lower said transverse edges of said planar sections.

17. The post protector of claim 16, wherein each of said flange leaves is relatively orthogonal to each said planar section.

18. The post protector of claim 16, wherein each of said planar sections has an included angle between said adjacent planar sections.

19. The post protector of claim 18, wherein said transverse edges form a C-shape cross-section, said C-shape to be placed around at least said portion of said column to be protected.

20. A post protector to prevent objects from colliding with a portion of a column located on a floor, said post protector comprising:
  a. an elongated portion placed adjacent to said portion of said column;
  b. a flange portion, having openings therethrough and extending from said elongated portion, said flange portion including an elastic membrane means for allowing elastic movement of said flange portion;
  c. fastening means for protruding through said openings and anchoring said post protector to said floor; wherein said elastic membrane means having holes therethrough, and said fastening means further protruding through said openings and said holes; and,
  d. said elongated portion further including an elastic post cushion means for absorbing impact forces from said objects colliding with said post protector.

21. The post protector of claim 20, wherein said elongated portion includes an inside surface and an outside surface, said elastic post cushion in substantial side-by-side contact with said inside surface.

22. The past protector of claim 21, wherein said inside surface includes a top portion and a bottom portion, said bottom portion adjacent said flange portion, said top portion in substantial side-by-side contact with said elastic post cushion.

23. The post protector of claim 20, wherein said flange portion includes a plurality of flange leaves depending from said elongated portion.

24. The post protector of claim 23, wherein said elongated portion includes a plurality of planar sections, each said planar section adjacent at least one other said planar section, each section having longitudinal and lower transverse edges, at least one said longitudinal edge of one of said planar sections joined to another said longitudinal edge of another said planar section.

25. The post protector of claim 24, wherein one of said flange leaves extends from each of said lower transverse edges of said planar sections.

26. The post protector of claim 25, wherein each of said flange leaves is relatively orthogonal to each said planar section.

27. The post protector of claim 26, wherein said transverse edges form a C-shape cross-section, said C-shape to be placed around said portion of said column to be protected.

28. A post protector which is fastened to a floor and prevents objects from colliding with a portion of a column, said post protector comprising:
   a. an elongated portion placed adjacent to at least one said portion of said column;
   b. a flange portion, having openings therethrough and extending from said elongated portion, said flange portion having an upper side and a lower side, said flange portion including an elastic membrane in substantial abutting side-by-side contact with said upper side and said lower side;
   c. fastening means for protruding through said cylinder and anchoring said post protector to said floor; and,
   d. said elongated portion further including an elastic post cushion means for absorbing impact forces from said objects colliding with said post protector.

29. The post protector of claim 21, wherein said elastic membrane covers said upper side and said lower side.

30. A post protector to prevent objects from impacting with a portion of a column on a floor, said post protector comprising:
   a. an elongated portion palced adjacent and around said column,
   b. flange means for fastening said post protector to said floor and having openings therethrough, said flange means extending from said elongated portion,
   c. fastening means for protruding through said openings and anchoring said post protector to said floor,
   d. said flange means further including elastic membrane means for allowing said post protector to elastically move upon impact, whereby said post protector non-destructively absorbs said impact of said object, wherein said elastic membrane means having holes therethrough and said fastening means further protruding through said openings and said holes.

31. The post protector of claim 30, wherein said flange means includes a flange portion having floor sides and upper sides and a thickness therebetween, said membrane means having a top membrane surface and a bottom membrane surface and a distance therebetween, said distance being at least three times said thickness of said flange portion.

32. The post protector of claim 30, wherein said membrane means includes a bottom portion and a top portion, said top portion substantially disposed upon said upper side, said bottom portion substantially disposed between said floor side and said floor, said thickness of each said portion substantially equal.

33. The post protector of claim 32, wherein each said bottom portion and said top portion has a thickness extending orthogonally from said floor side and said upper side respectively.

34. The post protector of claim 30, wherein said flange means includes a flange portion having an upper side, a floor side and a thickness therebetween, said thickness of said flange portion substantially equal to said thickness of either said top portion or said bottom portion.

35. The post protector of claim 30, wherein said elastic membrane means includes a cylinder portion disposed within each of said openings, and said elastic cylinder means having a hole with an inside diameter, said inside diameter being substantially less than said opening diameter.

36. The post protector of claim 35, wherein said inside diameter is at least 50% less than said opening diameter.

37. The post protector of claim 30, wherein said elongated portion includes an inside surface, said inside surface includes a top portion and a bottom portion, said bottom portion adjacent said flange means, said top portion including an elastic post cushion means for preventing said post protector from destructively impacting said column upon impact.

38. A post protector to prevent objects from colliding with a portion of a column located on a floor, said post protector comprising:
   a. an elongated portion placed adjacent to a portion of said column;
   b. a flange portion, extending from said elongated portion and having at least one opening therethrough;
   c. elastic membrane means for allowing elastic movement of said flange portion; and,
   d. fastening means for protruding through said at least one opening and anchoring said flange portion to said floor, wherein said elastic membrane means having at least one hole and said fastening means further protruding through said at least one opening and said at least hole.

39. The post protector of claim 38, wherein said flange portion includes a plurality of openings.

* * * * *